(12) United States Patent
Kobayashi et al.

(10) Patent No.: US 9,762,993 B2
(45) Date of Patent: Sep. 12, 2017

(54) HORN APPARATUS

(71) Applicant: Mitsuba Corporation, Kiryu-shi, Gunma (JP)

(72) Inventors: Yoshikazu Kobayashi, Kiryu (JP); Hiroshi Yokoyama, Kiryu (JP); Ryota Matsukura, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 14/848,665

(22) Filed: Sep. 9, 2015

(65) Prior Publication Data

US 2016/0080860 A1 Mar. 17, 2016

(30) Foreign Application Priority Data

Sep. 12, 2014 (JP) .................. 2014-186478

(51) Int. Cl.
*H04R 1/20* (2006.01)
*H04R 1/30* (2006.01)
*B60C 5/00* (2006.01)
*H04R 3/04* (2006.01)

(52) U.S. Cl.
CPC .......... *H04R 1/30* (2013.01); *B60C 5/00* (2013.01); *B60C 5/008* (2013.01); *H04R 3/04* (2013.01); *H04R 2499/13* (2013.01)

(58) Field of Classification Search
CPC ........ H04R 1/30; H04R 2499/13; H04R 3/04; B60Q 5/008; B60Q 5/00
USPC ....................................... 381/340
See application file for complete search history.

(56) References Cited

U.S. PATENT DOCUMENTS

| | | | | |
|---|---|---|---|---|
| 2010/0119096 A1* | 5/2010 | Suzuki | ..... | G10K 9/20 381/340 |
| 2010/0246875 A1* | 9/2010 | Takahashi | ..... | G10K 9/13 381/340 |
| 2011/0304445 A1* | 12/2011 | Nakayama | ..... | B60Q 5/008 340/425.5 |
| 2012/0194329 A1* | 8/2012 | Nakayama | ..... | H04R 3/04 340/425.5 |
| 2014/0015655 A1* | 1/2014 | Bechtold | ..... | B60Q 5/00 340/425.5 |

FOREIGN PATENT DOCUMENTS

JP 5058912 8/2012

* cited by examiner

*Primary Examiner* — Duc Nguyen
*Assistant Examiner* — Sean H Nguyen
(74) *Attorney, Agent, or Firm* — McCormick, Paulding & Huber LLP

(57) ABSTRACT

It is an object of the present invention is to smoothen air flow at the time of vibrations of the diaphragm, and to suppress variations in acoustic characteristics. Since the inclined surface 37c of the washer 37, which forms the air flow channel 50, is an inclined surface having a diameter gradually reduced with distance from the diaphragm 35 in the axial direction of the movable iron core 36, compared with the conventional step-shaped air flow channel having vertical surfaces, air flow in the air flow channel 50 can be smoothened. Therefore, disturbance in air flow is not easily generated in the air flow channel 50, and variations in acoustic characteristics of the horn apparatus 10 can be suppressed.

6 Claims, 10 Drawing Sheets

[at the time of suction]

[at the time of discharge]

[flow rate]

[at the time of suction]

[at the time of discharge]

[flow rate]

[at the time of suction]

[at the time of discharge]

[flow rate]

HORN APPARATUS

CROSS-REFERENCE TO RELATED APPLICATION

The present application claims priority from Japanese Patent Application No. JP2014-186478 filed on Sep. 12, 2014, the content of which is hereby incorporated by reference into this application.

TECHNICAL FIELD OF THE INVENTION

The present invention relates to a horn apparatus for resonating a sound generated by vibrations of a diaphragm with a resonator.

BACKGROUND OF THE INVENTION

An electromagnetic type horn apparatus is mounted in a front side of a vehicle such as automotive vehicle. As one example, an electromagnetic type horn apparatus for resonating a sound generated by vibrations of a diaphragm with a resonator is known. Such a horn apparatus provided with a resonator is described in, for example, Japanese Patent No. 5058912 (FIG. 1). The horn apparatus described in Japanese Patent No. 5058912 (FIG. 1) is provided with a case having a bottomed tubular shape, an electromagnet (a coil and a fixed iron core) provided in the case, a diaphragm provided so as to close an opening of the case, a movable iron core which vibrates the diaphragm, and a cover provided on an outer surface of the diaphragm and forming an air vibrating chamber in the case. In addition, a sound emitting opening is provided at a central part of the cover, and a resonator is disposed to be opposed to the sound emitting opening. As a result, the sound generated by the vibrations of the diaphragm passes through inside of the resonator to resonate and is then emitted to outside the resonator.

However, according to the horn apparatus described in Japanese Patent No. 5058912 (FIG. 1), as shown in FIG. 11 which is a partial enlarged view of a conventional horn apparatus, a setting hole "f" of a diaphragm "e" is swage-fixed to a setting portion "b" of a movable iron core "a" via a first washer "c" having a large diameter and a second washer "d" having a small diameter. Therefore, the cross sectional shape of a sound emitting opening "g" and an annular air flow channel "h" is formed between the washers "c" and "d", and becomes a stepped shape having vertical surfaces "k" which disturbs a smooth air flow between an air vibrating chamber "m" and a resonator "n". Therefore, the horn apparatus encounters a problem that disturbance of air flow is easily generated during operations and variations are easily generated in acoustic characteristics.

SUMMARY OF THE INVENTION

It is an object of the present invention to provide a horn apparatus which can smoothen air flow at the time of vibrations of the diaphragm, and suppress variations in acoustic characteristics.

In accordance with one aspect of the present invention, there is provided a horn apparatus for resonating a sound generated by a vibration of a diaphragm with a resonator provided with a main body portion having a sound passage formed into a spiral shape, the horn apparatus comprising: a case attached to the resonator; a coil provided in the case; a fixed iron core disposed at a center of the coil and fixed to the case; a movable iron core opposed to the fixed iron core, fixed to the diaphragm, wherein when electric power is supplied to the coil, the movable iron core is attracted to the fixed iron core so as to vibrate the diaphragm; a partition wall member provided between the diaphragm and a main body portion of the resonator; a through-hole provided in the partition wall member and coaxial with the movable iron core; and an air flow channel formed into an annular shape by an outer peripheral portion of the movable iron core and an inner peripheral portion of the through-hole, air flow being caused in the air flow channel by the vibration of the diaphragm, wherein at least one of the outer peripheral portion of the movable iron core and the inner peripheral portion of the through-hole is an inclined surface having a diameter which is gradually reduced with distance from the diaphragm in an axial direction of the movable iron core.

In accordance with another aspect of the present invention, the movable iron core is provided with a washer fixing the diaphragm to the movable iron core, and an outer peripheral portion of the washer serves as the inclined surface.

In accordance with another aspect of the present invention, the partition wall member is a cover which is fixed to the case and the resonator in an airtight state, and the inner peripheral portion of the through-hole of the cover serves as the inclined surface.

In accordance with another aspect of the present invention, the partition wall member is a base member forming a sound passage of the resonator together with the main body portion, and attached to the case; and an inner peripheral portion of the through-hole of the base member serves as the inclined surface.

According to the present invention, at least either one of the outer peripheral portion and the inner peripheral portion forming the air flow channel is the inclined surface having the diameter which is gradually reduced as the inclined surface gets away from the diaphragm in the axial direction of the movable iron core. Therefore, compared with the conventional step-shaped air flow channel having vertical surfaces, air flow in the air flow channel can be smoothened. Therefore, disturbance of air flow in the air flow channel is not easily generated, and variations in acoustic characteristics of the horn apparatus can be suppressed.

DESCRIPTION OF THE PREFERRED EMBODIMENTS

Hereinafter, a first embodiment of the present invention will be described in detail with reference to the accompanying drawings.

Figure 1:
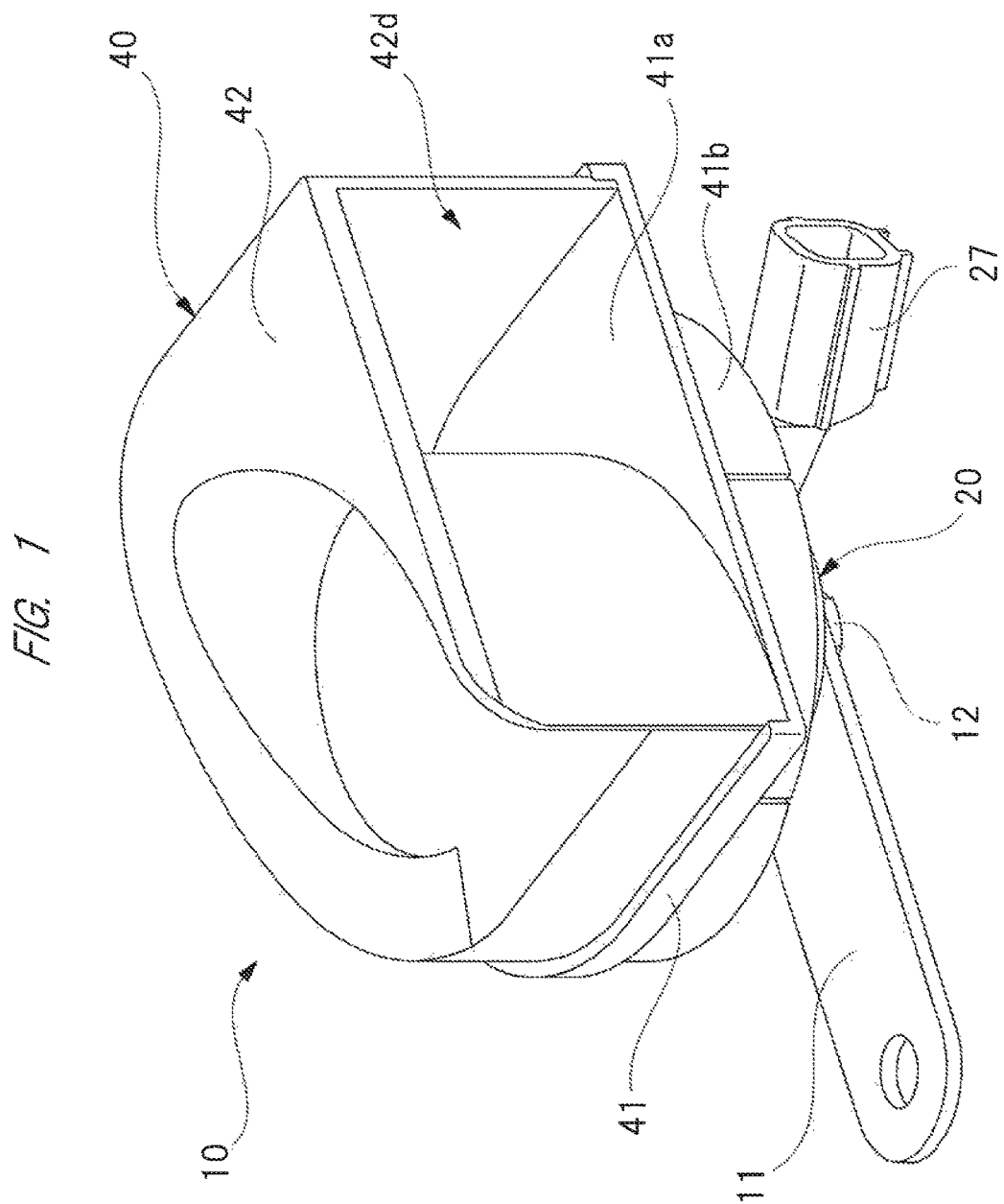
FIG. 1 is a perspective view showing a horn apparatus of the present invention.
Figure 2:
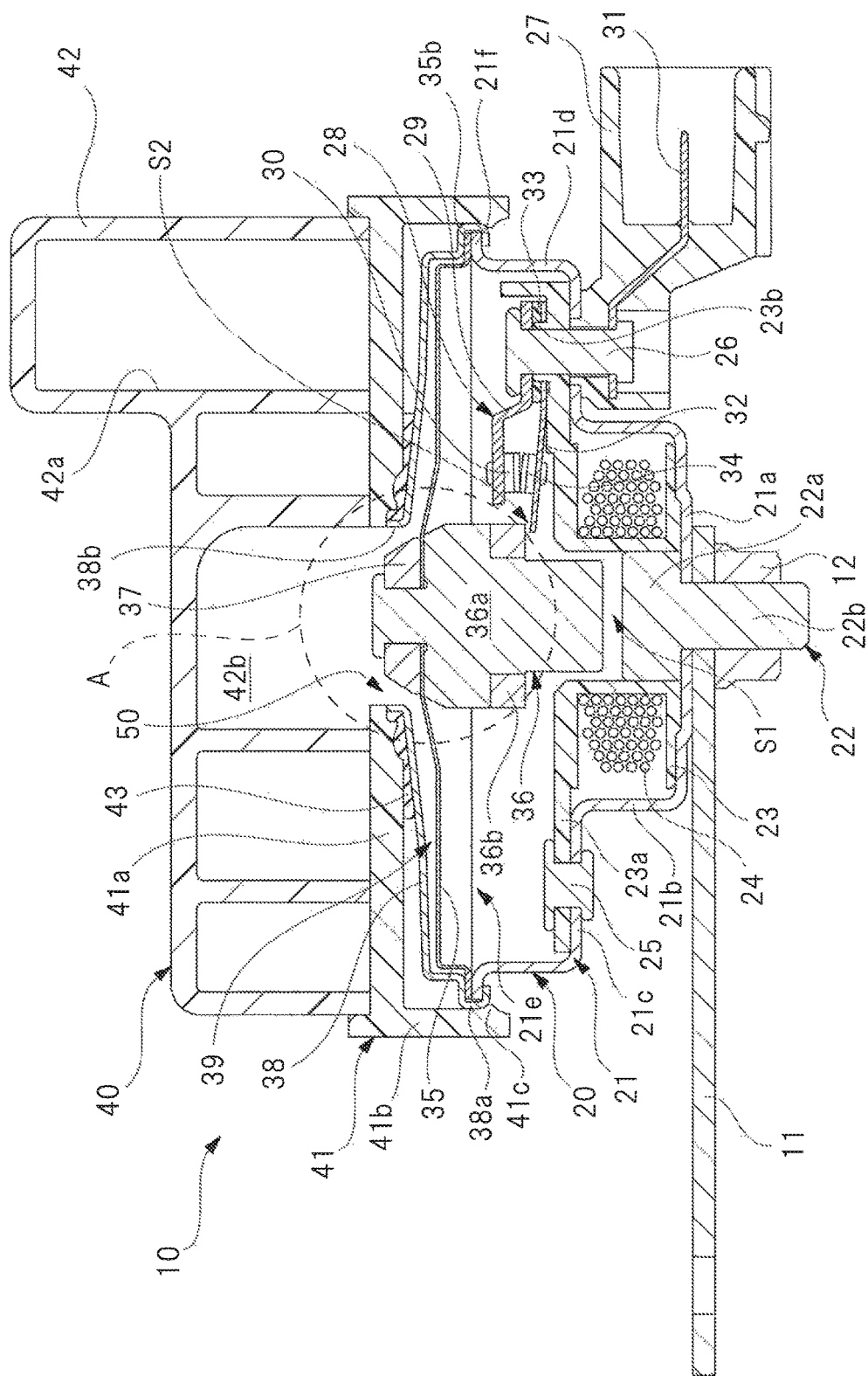
FIG. 2 is a cross-sectional view showing an internal structure of the horn apparatus of FIG. 1.
Figure 3:
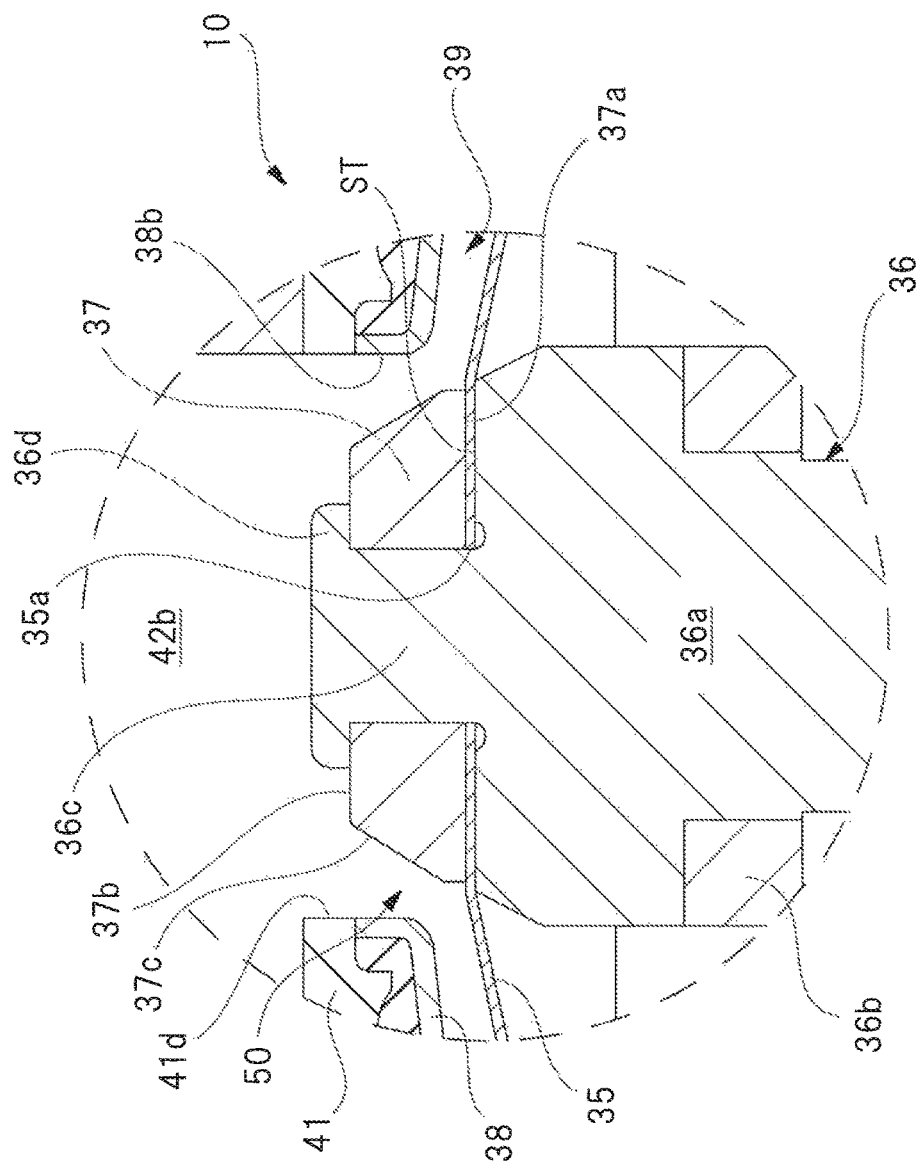
FIG. 3 is an enlarged cross-sectional view showing a portion "A" surrounded by a broken-line circle in FIG. 2.
Figure 4:
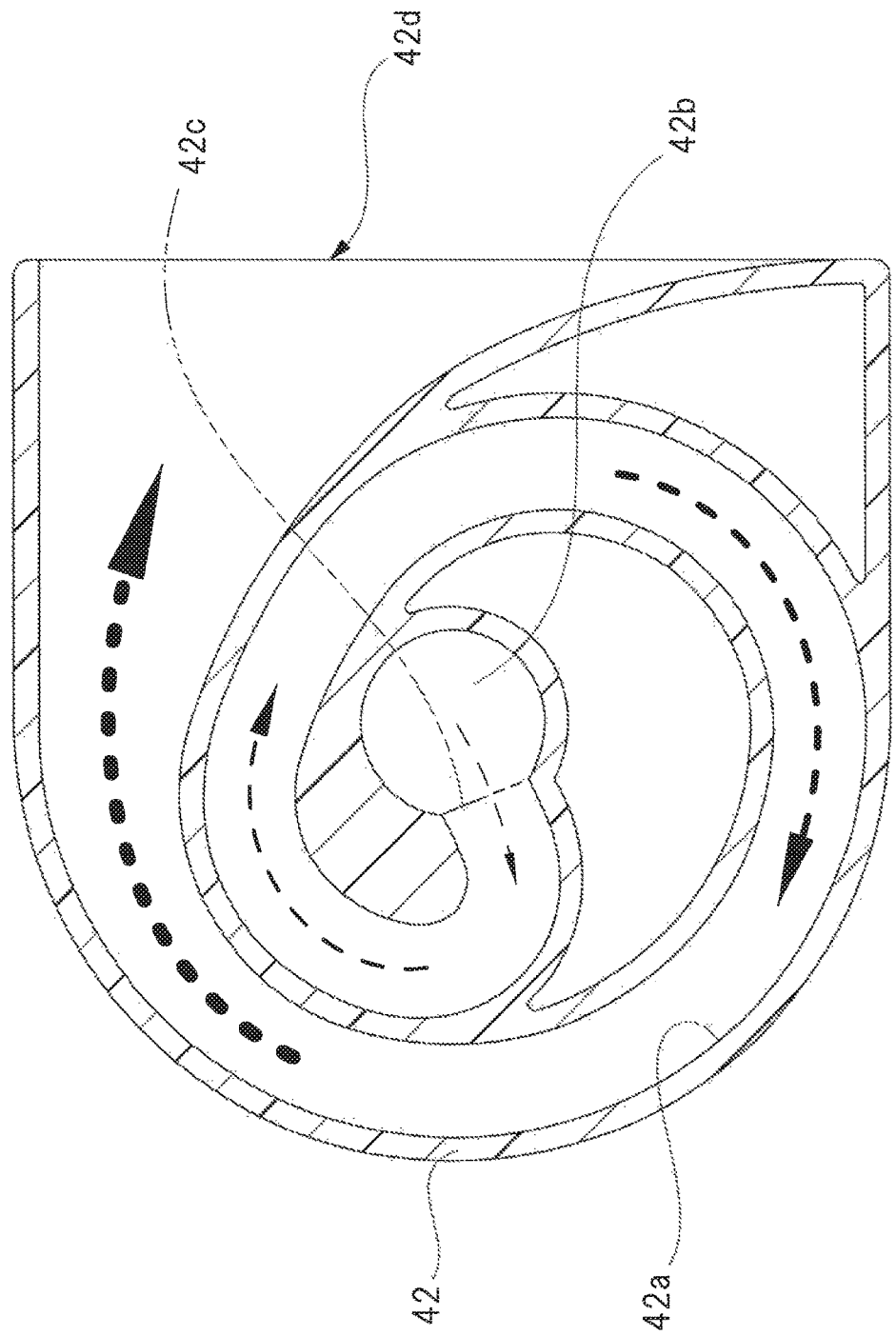
FIG. 4 is a cross-sectional view showing an internal structure of a resonator of FIG. 2.
Figure 5A:
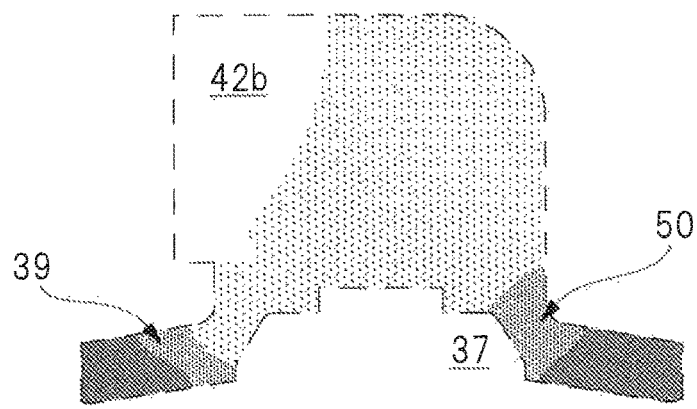
FIG. 5A is a simulation view showing a pressure distribution at the time of suction.
Figure 5B:
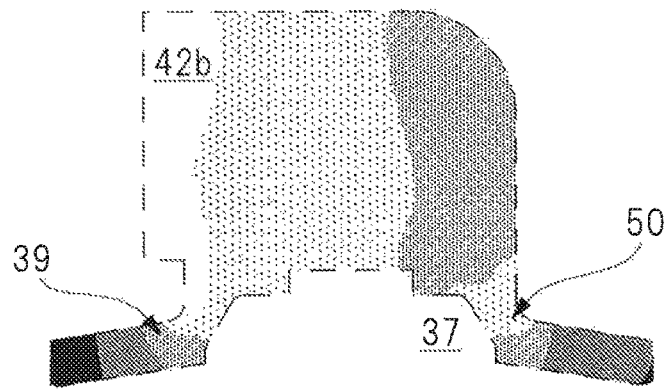
FIG. 5B is a simulation view showing a pressure distribution at the time of discharge.
Figure 5C:
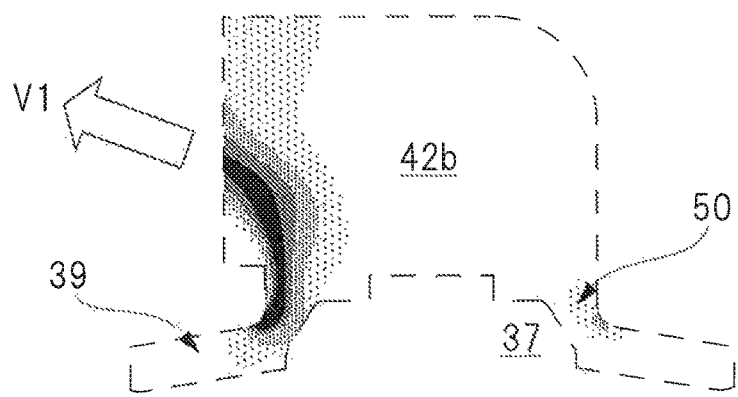
FIG. 5C is a simulation view showing a flow rate of air discharged from an air vibrating chamber to the resonator.
Figure 6A:
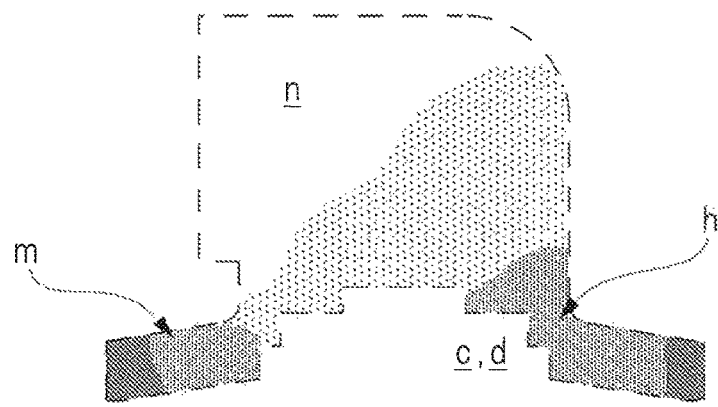
FIGS. 6A-6C are simulation drawings of conventional techniques corresponding to FIGS. 5A-5C.
Figure 6B:
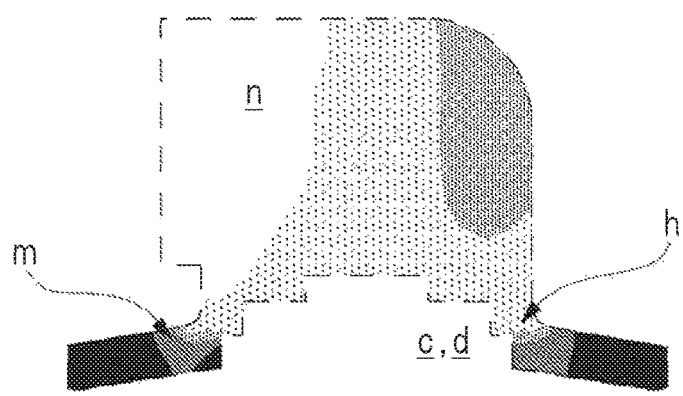
Figure 6C:
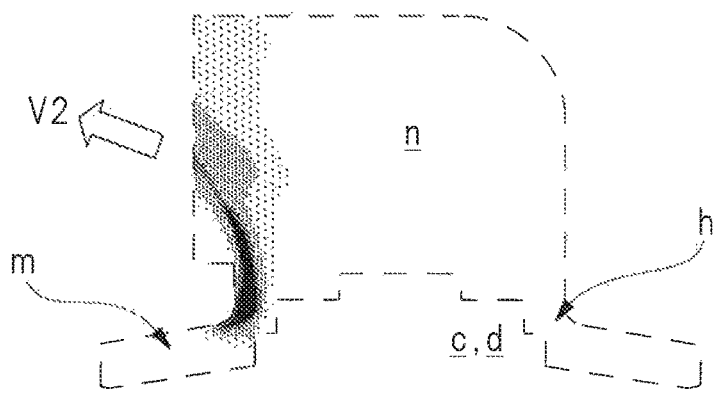
Figure 7A:
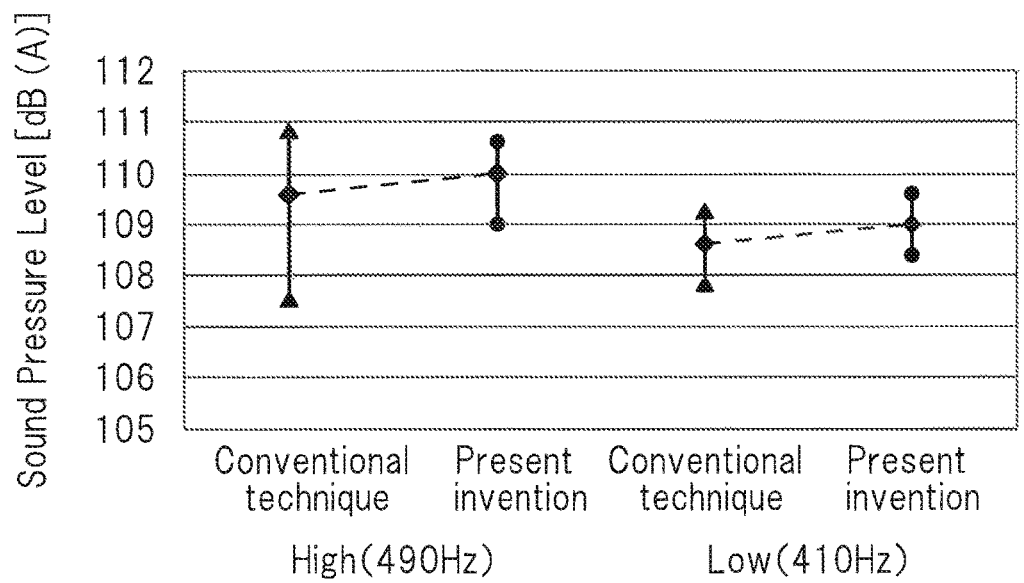
FIG. 7A is a comparison graph explaining variation improvement of a sound pressure level [dB (A)]
Figure 7B:
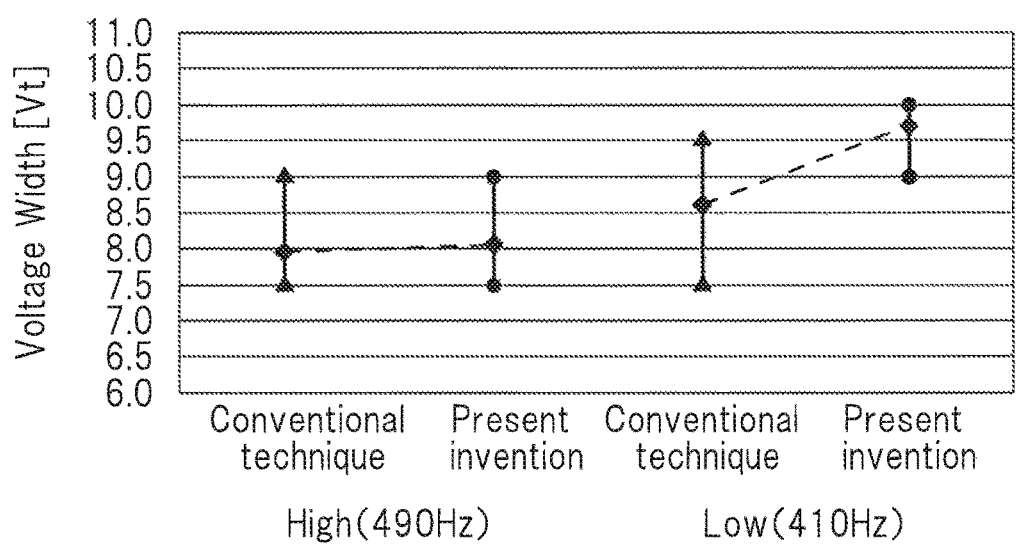
FIG. 7B is a comparison graph explaining variation improvement of a voltage width [Vt]

FIG. 1 is a perspective view showing a horn apparatus of the present invention, FIG. 2 is a cross-sectional view showing an internal structure of the horn apparatus of FIG. 1, FIG. 3 is an enlarged cross-sectional view showing a portion "A" surrounded by a broken-line circle in FIG. 2, FIG. 4 is a cross-sectional view showing an internal structure of a resonator of FIG. 2, FIG. 5A is a simulation view showing a pressure distribution at the time of suction, FIG. 5B is a simulation view showing a pressure distribution at the time of discharge, FIG. 5C is a simulation view showing a flow rate of air discharged from an air vibrating chamber to the resonator, FIGS. 6A-6C are simulation drawings of conventional techniques corresponding to FIGS. 5A-5C, FIG. 7A is a comparison graph explaining variation improvement of a sound pressure level [dB (A)], and FIG. 7B is a comparison graph explaining variation improvement of a voltage width [Vt].

As shown in FIG. 1, a horn apparatus 10 is mounted in a front side of a vehicle such as automotive vehicle, and generates a warning sound. A base end side of an attachment stay 11 is fixed to the horn apparatus, and a distal end side of the attachment stay 11 is configured to be fixed to a cross member or the like, which forms a framework of the front side of the vehicle, by a fixing bolt. In this case, the horn apparatus 10 is an electromagnetic spiral horn, and actuated so as to generate a warning sound when a horn switch provided on steering or the like is operated.

The horn apparatus 10 is provided with a horn main body 20 and a resonator 40. The resonator 40 is attached to the horn main body 20, resonates the sound generated by the horn main body 20, and emits the sound to outside. In this case, sounds different in frequency from each other can be generated by preparing a plurality of horn main bodies 20 and resonators 40 different in specifications from each other, and arbitrarily combining them. In this case, in a normal passenger car or the like, two horn apparatuses, i.e., a (High) horn apparatus 10 for 490-Hz high-pitched sounds and a (Low) horn apparatus 10 for 410-Hz low-pitched sounds are combined and mounted.

As shown in FIG. 2, the horn main body 20 is provided with a case 21, and the case 21 is formed into a stepped bottomed tubular shape by subjecting a metal plate (electrically-conductive plate) to pressing or the like. A small-diameter housing portion 21b having a circular bottom portion 21a is provided in a bottom portion side of the case 21, and a large-diameter housing portion 21d having an annular bottom portion 21c is provided in an opening side of the case 21. The large-diameter housing portion 21d is larger in diameter than the small-diameter housing portion 21b, and the diameter size thereof is set to a size which is approximately two times that of the small-diameter housing portion 21b.

A pole 22 serving as a fixed iron core is provided in the small-diameter housing portion 21b of the case 21. The pole 22 is formed to be stepped by subjecting a round bar composed of a magnetic material to cutting or the like, and is provided with a main body portion 22a having a large diameter and a male thread portion 22b having a diameter smaller than that of the main body portion 22a. The main body portion 22a is fixed to the inner side of the circular bottom portion 21a by an adhesive agent or the like, and the male thread portion 22b penetrates through the circular bottom portion 21a and extends to outside the case 21. Furthermore, the base end side of the attachment stay 11 is fixed to the male thread portion 22b by a fixing nut 12.

An annular coil bobbin 23 is provided in the small-diameter housing portion 21b and around the main body portion 22a which forms the pole 22. The coil bobbin 23 is an insulating material such as a plastic formed into a predetermined shape, and in the inner side thereof formed to have an approximately U-shaped cross section, a coil 24 composed of an electrically-conductive material is wound by a predetermined number of turns. Therefore, when an electric current flows to the coil 24, the pole 22 disposed at the center of the coil 24 becomes an electromagnet and generates magnetic force. Herein, the coil 24 and the pole 22 form the electromagnet. The coil bobbin 23 is provided with an annular fixing portion 23a, and the annular fixing portion 23a is firmly fixed to the annular bottom portion 21c by a first rivet 25 and a second rivet 26 made of metal so that it does not rattle.

Herein, the length of the first rivet 25 is set to a length which is shorter than the length of the second rivet 26, and the first rivet 25 only has a function to fix the annular fixing portion 23a to the annular bottom portion 21c. On the other hand, in addition to the function to fix the annular fixing portion 23a to the annular bottom portion 21c, the second rivet 26 has a function to fix a connector connecting portion 27 and a power feeding mechanism 28 to the annular bottom portion 21c. Additionally, the connector connecting portion 27 is an insulating material such as a plastic formed into an approximately box shape, and a power feeding connector (not shown) of the vehicle is configured to be connected to the connector connecting portion 27.

The power feeding mechanism 28 for flowing an electric current to the coil 24 is provided in the large-diameter housing portion 21d. The power feeding mechanism 28 is provided with a fixed power feeding member 29 which is a metal plate formed into a stepped shape, and a longitudinal-direction first side (right side in the drawing) of the fixed power feeding member 29 is electrically connected to an axial-direction first end side (upper side in the drawing) of the second rivet 26. On the other hand, a fixed contact 30 formed into an approximately cylindrical shape is fixed to a longitudinal-direction second side (left side in the drawing) of the fixed power feeding member 29. Herein, a plus-side male terminal 31 is inserted in the connector connecting portion 27, and electrically connected to an axial-direction second end side (lower side in the drawing) of the second rivet 26. As a result, an electric current flows to the fixed contact 30 via the plus-side male terminal 31, the second rivet 26, and the fixed power feeding member 29.

A movable power feeding member 32 composed of a metal plate having flexibility is provided at the opposite part of the fixed power feeding member 29 along the axial direction of the second rivet 26. The movable power feeding member 32 is thinner than the fixed power feeding member 29, and it can be bent toward the axial direction of the second rivet 26 when external force is applied thereto.

The longitudinal-direction first side of the movable power feeding member 32 is fixed to a tubular insulating fixing portion 23*b* which is integrally molded with the annular fixing portion 23*a*. As a result, the movable power feeding member 32 and the second rivet 26 are in a mutually insulated state. Furthermore, an annular insulating sheet 33 composed of a plastic or the like is provided between the movable power feeding member 32 and the fixed power feeding member 29. As a result, the movable power feeding member 32 and the fixed power feeding member 29 are also in a mutually insulated state. Additionally, a first end side of the coil 24 is electrically connected (details are not shown) to the longitudinal-direction first side of the movable power feeding member 32.

A movable contact 34, which is formed into an approximately cylindrical shape, and fixed to the longitudinal-direction second side of the movable power feeding member 32. The movable contact 34 is opposed to the fixed contact 30, and when the movable power feeding member 32 is bent in the axial direction of the second rivet 26, the movable contact 34 becomes a contact state (power distributed state) and a non-contact state (power undistributed state) with respect to the fixed contact 30. Herein, a second end side of the coil 24 is electrically connected (details are not illustrated) to the case 21 which is an electrical conductor. As a result, the second end side of the coil 24 is ground-connected (minus-connected) to a car body via the case 21 and the attachment stay 11.

More specifically, in the state in which the movable contact 34 and the fixed contact 30 are in contact with each other, and in a horn-switch-operated power-distributed state, an electric current flows from the power feeding connector of the vehicle to the car body via the plus-side male terminal 31, the second rivet 26, the fixed power feeding member 29, the fixed contact 30, the movable contact 34, the movable power feeding member 32, the coil 24, the case 21, and the attachment stay 11. As a result, magnetic force is generated at the pole 22. Herein, the power feeding mechanism 28 is formed of the fixed power feeding member 29, the fixed contact 30, the movable power feeding member 32, and the movable contact 34.

An opening 21*e* is formed on the opposite side of the case 21 from the small-diameter housing portion 21*b* along the axial direction (upper side in the drawing), and the opening 21*e* is covered by a diaphragm 35. The diaphragm 35 is formed into an approximately disk shape by subjecting a thin steel plate to pressing or the like, and a movable iron core 36 is provided at a central part of the diaphragm 35.

Herein, the diaphragm 35 has a function as a plate spring for positioning the movable iron core 36 at a reference position shown in FIG. 2. In other words, in a so-called free state of the spring in which no external force is applied to the diaphragm 35, the diaphragm 35 maintains the movable iron core 36 in a state in which the movable iron core 36 is separated from the pole 22. The fixed contact 30 and the movable contact 34 of the power feeding mechanism 28 at this point are in a mutually contacted state as shown in FIG. 2.

The movable iron core 36 is provided in the case 21 and opposed to the pole 22. As shown in FIG. 3, the movable iron core 36 is provided with a main body portion 36*a* which is a magnetic material formed into a stepped cylindrical shape. An annular operation ring 36*b*, which operates the power feeding mechanism 28 (see FIG. 2), is attached in the side of the pole 22 along the axial direction of the main body portion 36*a* (lower side in the drawing). A setting portion 36*c* to which a setting hole 35*a* of the diaphragm 35 is set is integrally provided in the opposite side of the main body portion 36*a* from the pole 22 along the axial direction (upper side in the drawing). A stepped surface ST is provided between the setting portion 36*c* and the main body portion 36*a*, and a central part of the diaphragm 35 is configured to be placed on the stepped surface ST.

A washer 37, which is formed into a circular truncated conical shape for fixing the diaphragm 35 to the main body portion 36*a*, is attached to the setting portion 36*c*. Herein, the movable iron core 36 is composed by the main body portion 36*a*, the manipulation ring 36*b*, the setting portion 36*c*, and the washer 37. The washer 37 is provided with a bottom surface 37*a* having a large diameter and an upper surface 37*b* having a small diameter, and the bottom surface 37*a* is directed toward the stepped surface ST. When a distal end part (upper side in the drawing) of the setting portion 36*c* is swaged in a state in which the diaphragm 35 and the washer 37 are attached to the setting portion 36*c*, the washer 37 is firmly fixed to the setting portion 36*c* in a state in which the diaphragm 35 is pressed against the stepped surface ST.

Figure 11:
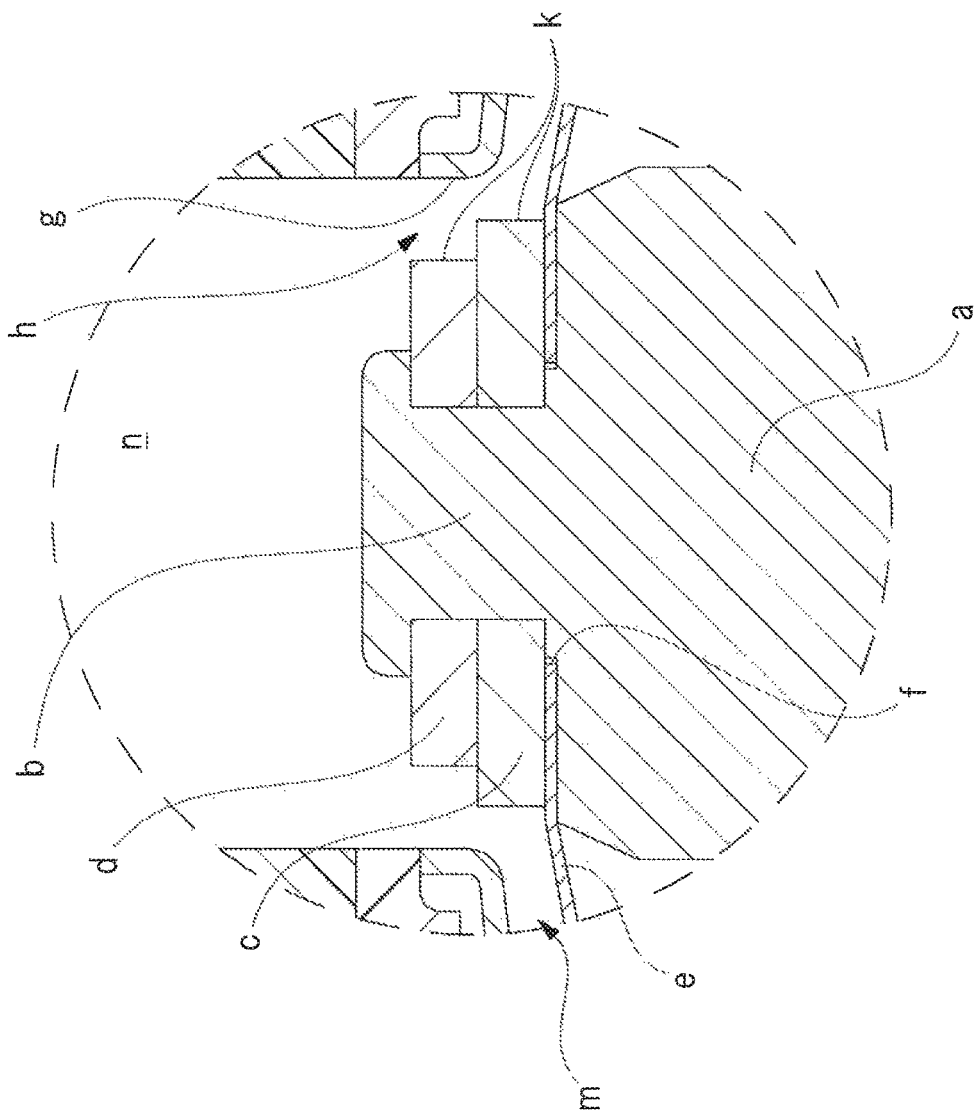
FIG. 11 is a partial enlarged view of a horn apparatus of a conventional technique.

Herein, a swaged portion 36*d* is formed by swaging the distal end part of the setting portion 36*c*, and presses the radial-direction inner side of the washer 37 toward the stepped surface ST. More specifically, the pressing load along the axial direction of the washer 37 concentrates on the radial-direction inner side of the washer 37. However, since the thickness of the washer 37 along the axial direction is a thickness which is approximately two times that of a conventional washer (see FIG. 11), the rigidity of the washer 37 is high, and the washer 37 is not deformed by a swaging operation of the setting portion 36*c*. Therefore, compared with a stack of two conventional washers (see FIG. 11), deformation around the setting hole 35*a* of the diaphragm 35 can be suppressed, and the diaphragm 35 can be fixed with respect to the movable iron core 36 with high precision without variations.

An annular inclined surface 37*c* is provided at an outer peripheral part of the washer 37, and disposed between the bottom surface 37*a* and the upper surface 37*b* along the axial direction of the washer 37. The diameter thereof is gradually reduced with distance from the diaphragm 35 in the axial direction of the movable iron core 36. Since the washer 37 having the inclined surface 37*c* is fixed to the setting portion 36*c* in this manner, the opposite side of the movable iron core 36 from the pole 22 along the axial direction has a tapered shape.

As shown in FIG. 2, the movable iron core 36 and the pole 22 are axially aligned with each other, and disposed in coaxial relationship with each other. The same side of the main body portion 36*a* as the pole 22 along the axial direction thereof partially enters the radial-direction inner side of the coil bobbin 23 via a gap. The gap S1 between the main body portion 36*a* and the pole 22 is set to be larger in size than a gap S2 between the operation ring 36*b* and the movable power feeding member 32 (S1>S2).

A cover 38 is formed into an approximately disk shape by subjecting a steel plate to pressing or the like, and provided in the opposite side of the diaphragm 35 from the case 21. An annular swaged fixing portion 38*a* is formed at an outer peripheral part of the cover 38, and a flange portion 21*f*, which is provided at an outer peripheral part of the case 21, and a flange portion 35*b*, which is provided at an outer peripheral part of the diaphragm 35, are sandwiched by the swaged fixing portion 38*a* in a state in which they face each other. As a result, both of the diaphragm 35 and the cover 38 are firmly fixed with respect to the case 21.

The cover 38 closes the opening 21*e*, is provided in an airtight state between the diaphragm 35 and the resonator 40, and constitutes a partition wall member in the present invention. A sound emitting opening (through-hole) 38b is coaxial with the movable iron core 36, and provided at a central part of the cover 38, and an annular air flow channel 50 is formed between the sound emitting opening 38b and the movable iron core 36. The air flow channel 50 is formed by an outer peripheral portion of the movable iron core 36 and an inner peripheral portion of the sound emitting opening 38b, and air flows in the air flow channel 50 by the vibrations of the diaphragm 35. More specifically, as shown in FIG. 3, the air flow channel 50 is formed by the inclined surface 37c of the washer 37 and the inner peripheral portion of the sound emitting opening 38b.

When the diaphragm 35 is vibrated, the volume of an annular air vibrating chamber (chamber) 39 formed between the cover 38 and the diaphragm 35 is configured to be increased/reduced. As a result, the air flow is generated in the air flow channel 50. The diaphragm 35 vibrates at a high frequency (for example, 490 Hz or 410 Hz), the vibrations become sounds, and the sounds are emitted from the air flow channel 50. Therefore, acoustic characteristics of the horn apparatus 10 is stabilized by improving the air flow in the air flow channel 50.

As shown in FIG. 2, the resonator 40 is attached to the same side of the horn main body 20 as the cover 38. The resonator 40 is opposed to the opening 21e of the case 21, and covers the entirety of the same side of the case 21 as the cover 38. The resonator 40 is composed of a base portion (base member) 41 which is made of a resin material such as a plastic, and a main body portion 42. The base portion 41 is provided with a bottom wall portion 41a which is formed into a bottomed tubular shape and formed into an approximately disk shape, and a wall portion 41b which is vertically raised from the bottom wall portion 41a.

Additionally, an engagement claw 41c engaged with the swaged fixing portion 38a of the cover 38 is provided at a distal end part of the wall portion 41b (lower side in the drawing). In other words, the base portion 41 is attached to the case 21. Furthermore, a cushion member 43 is an elastic material such as rubber formed into an annular shape, and provided between the base portion 41 and the cover 38. As a result, the resonator 40 can be attached to the horn main body 20 by a single touch without rattling.

The base portion 41 is provided between the diaphragm 35 and the main body portion 42 which forms the resonator 40, and constitutes a partition wall member in the present invention like the cover 38. As shown in FIG. 3, a sound emitting opening (through-hole) 41d is coaxial with the movable iron core 36, and provided at the central part of the base portion 41, and the inner diameter of the sound emitting opening 41d has the same inner diameter as that of the sound emitting opening 38b of the cover 38. As a result, no step is formed between the sound emitting opening 41d and the sound emitting opening 38b, and air can smoothly flow through the air flow channel 50.

As shown in FIG. 2, the main body portion 42 is provided to the opposite side of the base portion 41 from the wall portion 41b. The main body portion 42 is fixed to the base portion 41 by a fixing means such as adhesive agent or ultrasonic-wave welding. As shown in FIG. 4, a sound passage 42a formed into a spiral shape is provided in the main body portion 42. The sound passage 42a is formed by the base portion 41 and the main body portion 42 and is a passage through which the sound generated by the vibrations of the diaphragm 35 (see FIG. 2) passes. A sound emitting chamber 42b to which the sound generated by the vibrations of the diaphragm 35 reaches first is provided at an inlet side of the sound passage 42a, in other words, a central part of the spiral. Furthermore, an inlet opening 42c (see two-dot chain line in the drawing) is provided between the sound passage 42a and the sound emitting chamber 42b.

On the other hand, an outlet opening 42d is provided in an outlet side of the sound passage 42a, in other words, the part close to an outer periphery of the spiral so that sound is emitted from the outlet opening 42d toward outside. Herein, the opening area of the sound passage 42a is gradually increased from the inlet opening 42c toward the outlet opening 42d. As a result, as shown by broken-line arrows of FIG. 4, the sound of a predetermined sound volume can be emitted by amplifying the sound pressure level of the sound generated by the vibrations of the diaphragm 35. Note that the sound pressure level of the sound in an amplifying state is expressed by gradually increasing (thickening) the broken-line arrows of FIG. 4 from the inlet opening 42c toward the outlet opening 42d.

Next, operations of the horn apparatus 10 formed in the above manner will be explained in detail with reference to the drawings. The horn apparatus 10 is configured to continuously generate a warning sound by repeating [electromagnet attracting operation] and [diaphragm spring-force operation] shown below in an extremely short period of time while the horn switch is being operated.

[Electromagnet Attracting Operation]

When the horn switch is operated by a driver or the like, an electric current is supplied from the power feeding connector of the vehicle to the coil 24 via the plus-side male terminal 31, the second rivet 26, the fixed power feeding member 29, the fixed contact 30, the movable contact 34, and the movable power feeding member 32. As a result, electric power is distributed to the coil 24, and the coil 24 and the pole 22 function as an electromagnet. As a result, the movable iron core 36 is attracted to the pole 22 against the spring force of the diaphragm 35 and is moved toward the pole 22.

As a result, the operation ring 36b of the movable iron core 36 pushes down the movable power feeding member 32, thereby separating the movable contact 34 from the fixed contact 30. Therefore, the coil 24 becomes a power undistributed state, and the attracting force of the pole 22 eventually becomes zero. Note that, since the size of the gap S1 between the main body portion 36a and the pole 22 is set to be larger than the size of the gap S2 between the operation ring 36b and the movable power feeding member 32 (S1>S2), the movable iron core 36 and the pole 22 do not collide with each other.

[Diaphragm Spring-Force Operation]

After the attracting force of the pole 22 becomes zero, the movable iron core 36 is separated from the pole 22 by the spring force of the diaphragm 35. Then, the movable contact 34 abuts on the fixed contact 30 again because of the spring force of the movable power feeding member 32, and as a result, an electric current flows to the coil 24 again. In this manner, the [electromagnet attracting operation] and the [diaphragm spring-force operation] are repeated at a high speed so that the diaphragm 35 is vibrated by the vibrations of the movable iron core 36 and generates a sound.

Then, the sound generated by the vibrations of the diaphragm 35 is subjected to amplification of the sound pressure level via the air vibrating chamber 39, the air flow channel 50, the sound emitting chamber 42b, the inlet opening 42c, the sound passage 42a, and the outlet opening 42d, and then emitted to outside the resonator 40.

Herein, the air flow easiness in the air flow channel 50 in the horn apparatus 10 of the present invention and the air flow easiness in an air flow channel "h" in a horn apparatus of a conventional technique (see FIG. 11) are simulated by using a computer. Hereinafter, simulation results thereof are compared by using FIGS. 5 and 6.

Note that in the simulations of this case, a finite element method (FEM analysis) was used. Broken lines in FIGS. 5 and 6 show peripheries of air flow channels 50 and "h". Furthermore, in FIGS. 5A-5B and 6A-6B, tint-colored shaded parts show that the pressure (P) is low, and dark-colored shaded parts show that the pressure (P) is high. Furthermore, in FIGS. 5C and 6C, tint-colored shaded parts show that a flow rate (V) is low, and dark-colored shaded parts show that the flow rate (V) is high.

As shown in FIGS. 5A and 6A, "at the time of suction", the volumes of the air vibrating chambers 39 and "m" are increased, it can be understood that the pressure (P) in the air vibrating chamber 39 is higher in the present invention shown in FIG. 5A. This shows that air can easily flow in the air flow channel 50 of the present invention in comparison with the air flow channel "h" of the conventional technique. More specifically, since a large amount of air can be suctioned into the air vibrating chamber 39 with approximately no resistance in the present invention in comparison with the conventional technique, the pressure (P) in the air vibrating chamber 39 of the present invention is higher than that of the air vibrating chamber "m" of the conventional technique.

On the other hand, as shown in FIGS. 5B and 6B, "at the time of discharge", the volumes of the air vibrating chambers 39 and "m" are reduced, it can be understood that the pressure (P) in the air vibrating chamber "m" is higher in the conventional technique shown in FIG. 6B. This shows that, as well as the above described "at the time of suction", air easily flows in the air flow channel 50 of the present invention in comparison with the air flow channel "h" of the conventional technique. More specifically, since air in the air vibrating chamber 39 can be more quickly discharged in the present invention in comparison with the conventional technique, the pressure (P) in the air vibrating chamber "m" of the conventional technique is higher than that of the air vibrating chamber 39 of the present invention.

Furthermore, as shown in FIGS. 5C and 6C, when the flow rates (V) of the air flowing through the air flow channel 50 and the air flow channel "h" are compared to each other, the area of the dark-colored shaded part in the present invention is larger than that of the conventional technique. Therefore, it can be understood that the flow rate (V1) of the air discharged from the air vibrating chamber 39 is faster than the flow rate (V2) of the air discharged from the air vibrating chamber "m" (V1>V2). In this manner, it can be understood that air flows more smoothly in the air flow channel 50 of the present invention in comparison with the air flow channel "h" of the conventional technique. This means that, as shown in FIG. 2, when the coil 24 and the pole 22 function as the electromagnet, the diaphragm 35 can be effortlessly vibrated.

As shown in FIG. 7A, regarding the improvement degrees of variations of the sound pressure level [dB (A)], the present invention and the conventional technique are compared about those for 490-Hz high-pitched sound (High) and 410-Hz low-pitched sound (Low). As a result, it can be understood that, particularly in the 490-Hz horn apparatus for high-pitched sound, generation of variations are suppressed in the present invention in comparison with the conventional technique. Specifically, while the variation range of the sound pressure level in the conventional technique was 107.5 to 110.9 [dB (A)], the variation range of the sound pressure level in the present invention was 109.0 to 110.7 [dB (A)].

This is for a reason that, in the present invention, the washer 37 (see FIG. 3) having the circular truncated conical shape is used, deformation around the setting hole 35a of the diaphragm 35 is therefore suppressed, and the diaphragm 35 can be fixed with respect to the movable iron core 36 with high precision without variations. Note that in the 410-Hz horn apparatus for low-pitched sound, the variation range of the present invention is approximately the same as that of the conventional technique. The broken lines of FIG. 7A show average values of the variations of the sound pressure level.

Furthermore, as shown in FIG. 7B, regarding the improvement degrees of variations in the voltage width [Vt] at which the diaphragms 35 and "e" (see FIGS. 3 and 11) are vibrated and start generating sounds, the present invention and the conventional technique are compared to each other about those for 490-Hz high-pitched sound (High) and 410-Hz low-pitched sound (Low). As a result, it can be understood that, particularly in the 410-Hz horn apparatus for the low-pitched sound, generation of variations is suppressed in the present invention in comparison with the conventional technique. Specifically, while the variation range of the voltage width in the conventional technique was 7.5 to 9.5 [Vt], the variation range of the voltage width in the present invention was 9.0 to 10.0 [Vt].

This is for a reason that, in the present invention, since the washer 37 (see FIG. 3) having the circular truncated conical shape is used, air flows more easily in the air flow channel 50 (see FIG. 5) of the present invention in comparison with the air flow channel "h" of the conventional technique (see FIG. 6), and the diaphragm 35 is easily bent. Note that in the 490-Hz horn apparatus for high sound, the variation range of the present invention is approximately the same as that of the conventional technique. The broken line of FIG. 7B shows an average value of the variations of the voltage width.

As described above in detail, according to the horn apparatus 10 according to a first embodiment, the inclined surface 37c of the washer 37, which forms the air flow channel 50, is an inclined surface having a diameter which is gradually reduced from the diaphragm 35 in the axial direction of the movable iron core 36. Therefore, compared with the step-shaped air flow channel "h" having conventional vertical surfaces "k" (see FIG. 11), air flow in the air flow channel 50 can be smoothened. Therefore, disturbance of air flow is not easily generated in the air flow channel 50, and variations in acoustic characteristics of the horn apparatus 10 can be suppressed.

Furthermore, according to the horn apparatus 10 of the first embodiment, instead of two conventional washers "c" and "d" having different diameters (see FIG. 11), the thick single washer 37 having the circular truncated conical shape (see FIG. 3) is used; therefore, rigidity of the washer 37 can be increased. Therefore, the washer 37 is not deformed by the swaging operation of the setting portion 36c. Therefore, compared with the conventional case, assembly steps can be simplified while reducing the number of parts. Furthermore, deformation around the setting hole of the diaphragm due to the low rigidity of the conventional washers "c" and "d" can be reliably prevented, and variations in acoustic characteristics of each product can be suppressed more.

Next, second and third embodiment of the present invention will be described in detail with reference to the drawings. Additionally, parts of the second and third embodiment the same in function as those of the first embodiment are denoted by the same reference numbers, and the detail descriptions thereof are omitted here.

Figure 8:
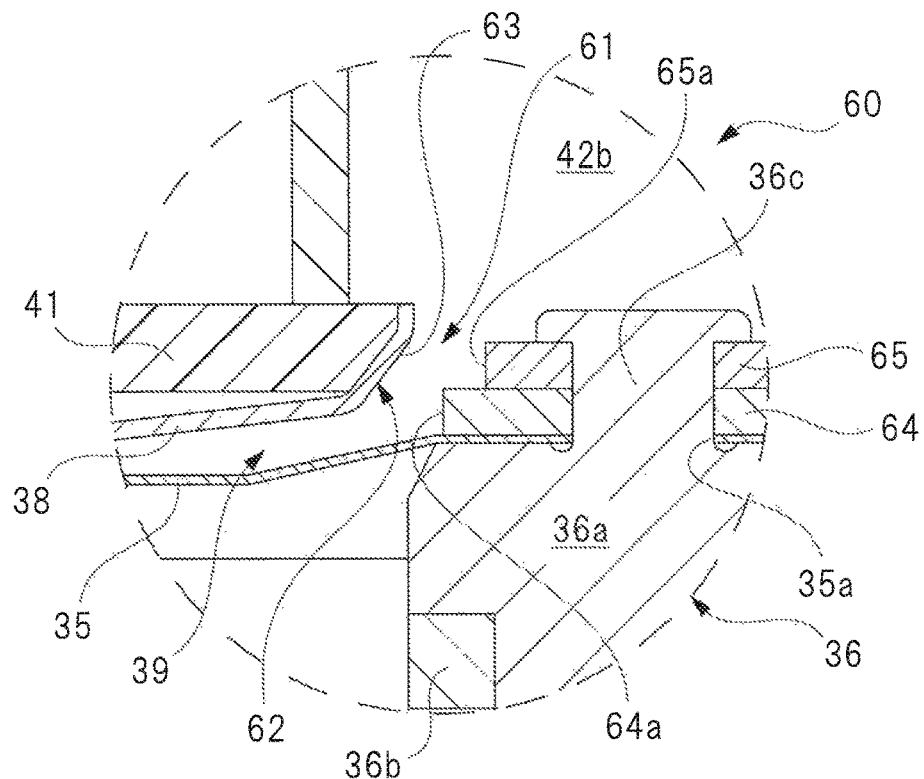
FIG. 8 is a partial enlarged view of a horn apparatus of a second embodiment.
Figure 9:
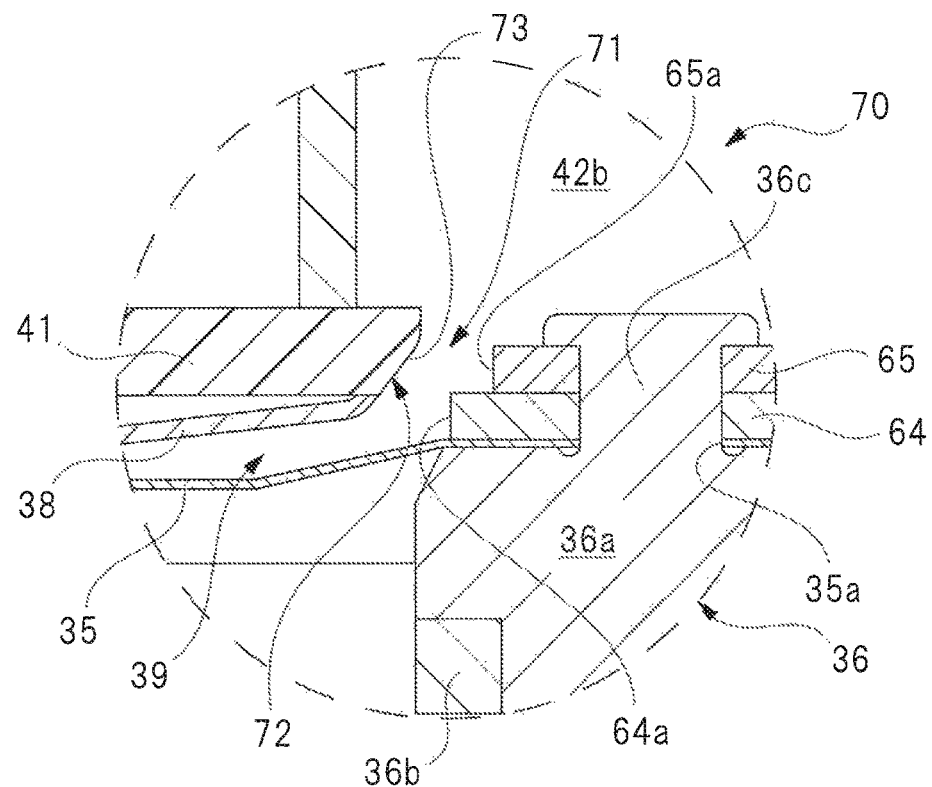
FIG. 9 is a partial enlarged view of a horn apparatus of a third embodiment.
Figure 10A:
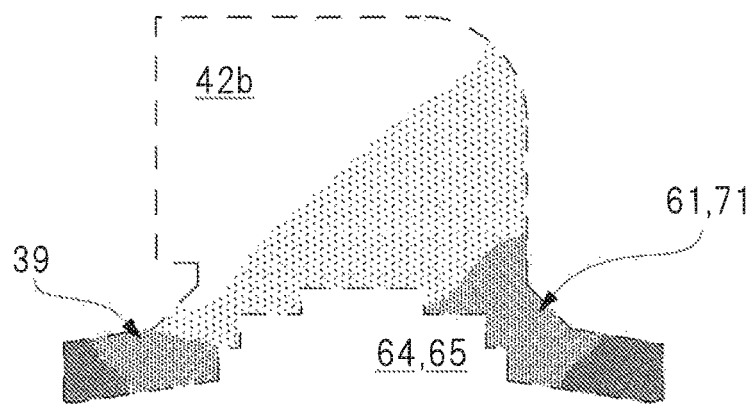
FIGS. 10A-10C are simulation drawings of the second and third embodiments corresponding to FIGS. 5A-5C.
Figure 10B:
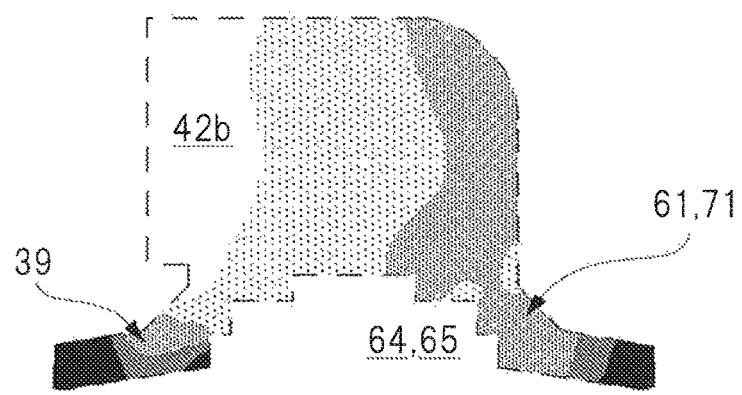
Figure 10C:
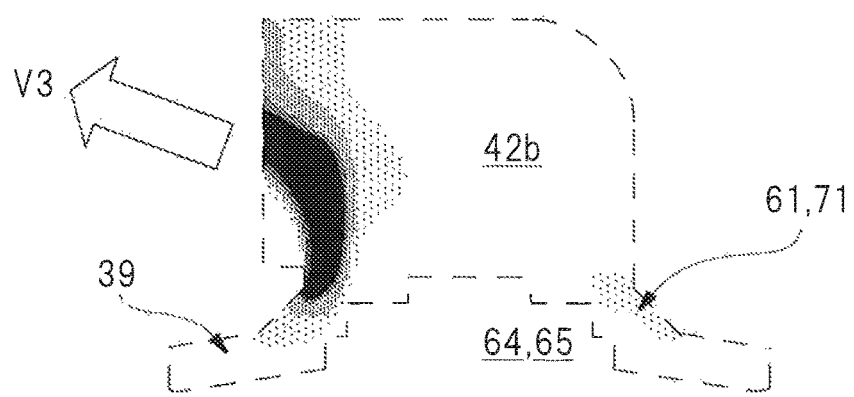

FIG. 8 is a partial enlarged view of a horn apparatus of a second embodiment, FIG. 9 is a partial enlarged view of a horn apparatus of a third embodiment, and FIGS. 10A-10C are simulation drawings of the second and third embodiments corresponding to FIGS. 5A-5C.

As shown in FIGS. 8 and 9, in horn apparatuses 60 and 70 of second and third embodiments, compared with the horn apparatus 10 of the first embodiment (see FIG. 3), only the shapes of air flow channels 61 and 71 are different from those of the first embodiment. Specifically, in the air flow channel 61 of the horn apparatus 60 of the second embodiment, an inclined surface 63 is provided at an inner peripheral portion of a sound emitting opening (through-hole) 62 of the cover 38 as a partition wall member. More specifically, the inner peripheral portion of the cover 38 serves as the inclined surface 63, and the diameter of the inclined surface 63 is gradually reduced as the inclined surface gets away from the diaphragm 35 in the axial direction of the movable iron core 36.

On the other hand, a large-diameter first washer 64 and a small-diameter second washer 65 are provided at the movable iron core 36 like the conventional case. In this manner, in the above described first embodiment, the inclined surface 37c (see FIG. 3) is provided in the radial-direction inner side of the air flow channel 50, in other words, at the outer peripheral portion of the movable iron core 36; however, in the second embodiment, the inclined surface 63 is provided in the radial-direction outer side of the air flow channel 61, in other words, at the inner peripheral portion of the sound emitting opening 62.

Furthermore, the air flow channel 71 of the horn apparatus 70 of the third embodiment has the same shape as the air flow channel 61 of the second embodiment, and differs from the second embodiment in that an inclined surface 73 is provided at the inner peripheral portion of a sound emitting opening (through-hole) 72 of the base portion 41 serving as a partition wall member. More specifically, the inner peripheral portion of the base portion 41 serves as the inclined surface 73, and the diameter of the inclined surface 73 is gradually reduced with distance from the diaphragm 35 in the axial direction of the movable iron core 36.

Herein, since the air flow channel 61 of the horn apparatus 60 (second embodiment) and the air flow channel 71 of the horn apparatus 70 (third embodiment) are the same in shape as each other, the simulation results thereof become the same results shown in FIGS. 10A-10C.

In the air flow channels 61 and 71 of the second and third embodiments, "at the time of suction" as shown in FIG. 10A, a pressure distribution approximately the same as that of the air flow channel 50 of the first embodiment (see FIG. 5A) was obtained. On the other hand, "at the time of discharge" as shown in FIG. 10B, a pressure distribution close to that of the air flow channel "h" of the conventional technique (see FIG. 6B) was obtained. Regarding this, it is assumed that, "at the time of discharge", vertical surfaces 64a and 65a of the first washer 64 and the second washer 65 exert adverse effects. Therefore, according to the simulation results thereof, it was found out that it is desired to form an air flow channel having a shape which combines a good part of the first embodiment and good parts of the second and third embodiments. In other words, it was found out that it is desired to provide inclined surfaces in both of the radial-direction outer side and the radial-direction inner side of the air flow channel.

Note that, it was found out that, in the second and third embodiments, it is advantageous to increase the flow rate (V) of the air which flows through the air flow channel as shown in FIG. 10C. More specifically, the flow rate (V3) of the air discharged from the air vibrating chamber 39 can be increased more than that of the first embodiment by providing the inclined surface in the radial-direction outer side of the air flow channel (V3>V1).

Also in the horn apparatuses 60 and 70 of the second and third embodiments formed in the above manner, advantageous effects approximately the same as those of the horn apparatus 10 of the above described first embodiment can be exerted.

The present invention is not limited to the above described embodiments, and it goes without saying that various modifications can be made without departing from the scope of the invention. For example, in the above described embodiments, the horn apparatus which are mounted in vehicles such as automotive vehicle have been shown; however the present invention is not limited thereto, but can be employed in horn apparatuses of railway vehicles, ships, construction machines and the like.

What is claimed is:

1. A horn apparatus for resonating a sound generated by a vibration of a diaphragm with a resonator provided with a main body portion having a sound passage formed into a spiral shape, the horn apparatus comprising:
   a case attached to the resonator;
   a coil provided in the case;
   a fixed iron core disposed at a center of the coil and fixed to the case;
   a movable iron core opposed to the fixed iron core, fixed to the diaphragm, wherein when electric power is supplied to the coil, the movable iron core is attracted to the fixed iron core so as to vibrate the diaphragm; and
   a partition wall member provided between the diaphragm and a main body portion of the resonator, the partition wall member having an inner peripheral portion which forms a through-hole coaxially aligned with the movable iron core;
   wherein the movable iron core has an outer peripheral portion tapered toward the resonator so that the movable iron core has a truncated conical shape, and the movable iron core is axially aligned with the through-hole;
   wherein the outer peripheral portion of the movable iron core has a gently-inclined surface inclined with respect to a center axis thereof;
   wherein the inner peripheral portion of the partition wall member and the outer peripheral portion of the movable iron core collectively forms an annular air flow channel; and
   wherein air flow caused by the vibration of the diaphragm is guided and reflected in a direction toward the resonator via the flow channel by the tapered outer peripheral portion of the movable iron core.

2. The horn apparatus according to claim 1, wherein the movable iron core is provided with a washer fixing the diaphragm to the movable iron core, and an outer peripheral portion of the washer serves as the inclined surface.

3. The horn apparatus according to claim 1, wherein the partition wall member is a cover which is fixed to the case and the resonator in an airtight state, and the inner peripheral portion of the through-hole of the cover serves as an additional inclined surface.

4. The horn apparatus according to claim 1, wherein the partition wall member is a base member forming a sound passage of the resonator together with the main body portion, and attached to the case; and an inner peripheral portion of the through-hole of the base member serves as an additional inclined surface.

5. The horn apparatus according to claim 2, wherein the partition wall member is a cover which is fixed to the case and the resonator in an airtight state, and the inner peripheral portion of the through-hole of the cover serves as an additional inclined surface.

6. The horn apparatus according to claim 2, wherein the partition wall member is a base member forming a sound passage of the resonator together with the main body portion, and attached to the case; and an inner peripheral portion of the through-hole of the base member serves as an additional inclined surface.

* * * * *